United States Patent
Barajas Gonzalez et al.

(10) Patent No.: US 10,057,290 B2
(45) Date of Patent: Aug. 21, 2018

(54) SHARED MAC BLOCKING

(71) Applicant: INTERNATIONAL BUSINESS MACHINES CORPORATION, Armonk, NY (US)

(72) Inventors: Emmanuel Barajas Gonzalez, Guadalajara (MX); Shaun E. Harrington, Sahuarita, AZ (US); Benjamin K. Rawlins, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 85 days.

(21) Appl. No.: 14/603,694

(22) Filed: Jan. 23, 2015

(65) Prior Publication Data

US 2016/0219074 A1 Jul. 28, 2016

(51) Int. Cl.
*H04L 29/06* (2006.01)

(52) U.S. Cl.
CPC .......... *H04L 63/20* (2013.01); *H04L 63/0236* (2013.01); *H04L 63/1441* (2013.01); *H04L 2463/146* (2013.01)

(58) Field of Classification Search
CPC ... H04L 63/20; H04L 63/302; H04L 63/1441; H04L 63/0236; H04L 2463/146
See application file for complete search history.

(56) References Cited

U.S. PATENT DOCUMENTS

| | | | |
|---|---|---|---|
| 8,091,131 B2 * | 1/2012 | Krishnamurthy | H04L 63/1416 370/254 |
| 8,270,406 B2 * | 9/2012 | Park | H04L 63/1441 370/390 |
| 8,381,295 B2 * | 2/2013 | Stolfo | G06F 21/552 380/59 |
| 8,533,823 B2 | 9/2013 | Szeto et al. | |
| 2006/0153192 A1 * | 7/2006 | Pohlabel | H04L 63/0236 370/392 |
| 2009/0265777 A1 | 10/2009 | Scott | |
| 2010/0175131 A1 | 7/2010 | Sheymov | |
| 2013/0347113 A1 | 12/2013 | Yu et al. | |
| 2015/0264081 A1 * | 9/2015 | Lee | H04L 61/103 726/22 |

* cited by examiner

*Primary Examiner* — Beemnet Dada
(74) *Attorney, Agent, or Firm* — Griffiths & Seaton PLLC (57) ABSTRACT

For enhancing security in a complex network by a computer processor device, a processor collaborates with at least one additional processor device in a higher hierarchical order in the complex network. A Media Access Control (MAC) address of an offending network device is shared between the processor devices such that access of the offending network device to portions of the complex network under the supervisory control of the processor devices may be subsequently blocked.

15 Claims, 7 Drawing Sheets

SHARED MAC BLOCKING

BACKGROUND OF THE INVENTION

Field of the Invention

The present invention relates in general computing systems, and more particularly to, various embodiments for enhancing security in complex networks.

Description of the Related Art

When speaking of the World Wide Web (abbreviated as WWW or W3, commonly known as the Web), the essential word to describe the system is "web." The Web allows users (persons and machines) all over the world to communicate with each other by a series of handoffs in order for their information to get where they are wanting the information to arrive. This "web" of systems performing handoffs has provided the modern world with one of the most efficient and fastest methods of communication ever known.

SUMMARY OF THE INVENTION

With the advent of the Web, as with any method of communication or access, the human element can, at times, exploit the situation, and cause issues, or even havoc. If a user has malevolent intentions, the skill set required to do so is relatively low; simply by spamming communications to a device can cause serious issues to that device, and are very hard to make cease. When these attacks take place, the response is typically to attempt (often times in vain) to identify the source so that a consequence can be enacted upon them at a later date while often times just hoping the attack will stop in the near future.

While prosecutions have been successful in the past, there is no denying the damage was done, and attacks have commenced for the length of the time the aggressor chose while the victim having no method of ceasing the attack short of changing their setup. Essentially, as it stands, when denial-of-service attacks occur, the response is to attempt to identify the aggressor and hope the attack stops soon. While this does yield results, they in no way guarantee that the issue will cease or that it will not happen again the very same way in the future. While this method of hopeful break-fix is moderately effective, it in no way guarantees the desired result of fewer attacks.

To address the foregoing challenges, the mechanisms of the illustrated embodiments describe methodologies that allows Web authorities, such as Internet Service Providers (ISPs), but also any internet appliance with network identification, to coordinate and collaborate using shared identification and statistical information of known and/or new offenders of typical cyber illicit activities, as will be further explained below.

Accordingly, various embodiments for enhancing security in a complex network by a computer processor are provided. In one such embodiment, a method for enhancing security in a complex network is provided. Pursuant to this method, a processor collaborates with at least one additional processor device in a higher hierarchical order in the complex network. A Media Access Control (MAC) address of an offending network device is shared between the processor devices such that access of the offending network device to portions of the complex network under the supervisory control of the processor devices may be subsequently blocked.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, when speaking of the World Wide Web (abbreviated as WWW or W3, commonly known as the Web), the essential word to describe the system is "web." The Web allows users (persons and machines) all over the world to communicate with each other by a series of handoffs in order for their information to get where the user wishes the information to arrive. This "web" of systems performing handoffs has provided the modern world with one of the most efficient and fastest methods of communication ever known.

With the advent of the Web, as with any method of communication or access, the human element can, at times, exploit the situation, and cause issues, or even havoc. If a user has malevolent intentions, the skill set required to do so is relatively low; simply by spamming communications to a device can cause serious issues to that device, and are very hard to make cease. When these attacks take place, the response is typically to attempt (often times in vain) to identify the source so that a consequence can be enacted upon them at a later date while often times just hoping the attack will stop in the near future.

While prosecutions have been successful in the past, there is no denying the damage was done, and attacks have commenced for the length of the time the aggressor chose while the victim having no method of ceasing the attack short of changing their setup. Essentially, as it stands, when denial-of-service attacks occur, the response is to attempt to identify the aggressor and hope the attack stops soon. While this does yield results, they in no way guarantee that the issue will cease or that it will not happen again the very same way in the future. While this method of hopeful break-fix is moderately effective, it in no way guarantees the desired result of fewer attacks.

To address the foregoing challenges, the mechanisms of the illustrated embodiments describe methodologies that allow Web authorities, such as Internet Service Providers (ISPs), but also virtually any network (large or small) management unit to coordinate and collaborate using shared identification and statistical information of known and/or new offenders of typical cyber illicit activities. Principally, the mechanisms of the illustrated embodiments allow for the collaboration and sharing of Media Access Control (MAC) information associated with a particular offending network device, such that if the device address is identified as needing to be blocked, collaborating network management units collectively block the offending MAC address so as to block the device from the Web.

Using these mechanisms, ISPs could begin a flagging, and optional thresholding process, to share information when said illicit activities occur. If a MAC address was to be identified as a known purveyor of criminal activity the address, for example, the address could not only be blocked at that local ISPs level, preventing their traffic from being routed any farther, but also could be blocked by multiple ISP's levels via the collaboration method within the mechanisms of the present invention.

This coordinated methodology to target specific offenders would allow for offenders to not only not be able to attack their target of choice, but also could potentially prevent offenders from being able to attack anybody again, as will be further described. By addressing offending MAC information at the multiple ISP level, the mechanisms of the illustrated embodiments also allow for greater specific preventive measures to take place. For example, if a offender were using virtual machines and changing their MAC address, the ISP, being local to the offender, would have the ability to stop the offense at the source. Stopping attacks via the MAC at the source and sharing that information, also prevents offenders from simply changing locals, (i.e., free Wi-Fi locations, etc.), and continuing their assault from within a different ISPs boundaries.

Figure 1:
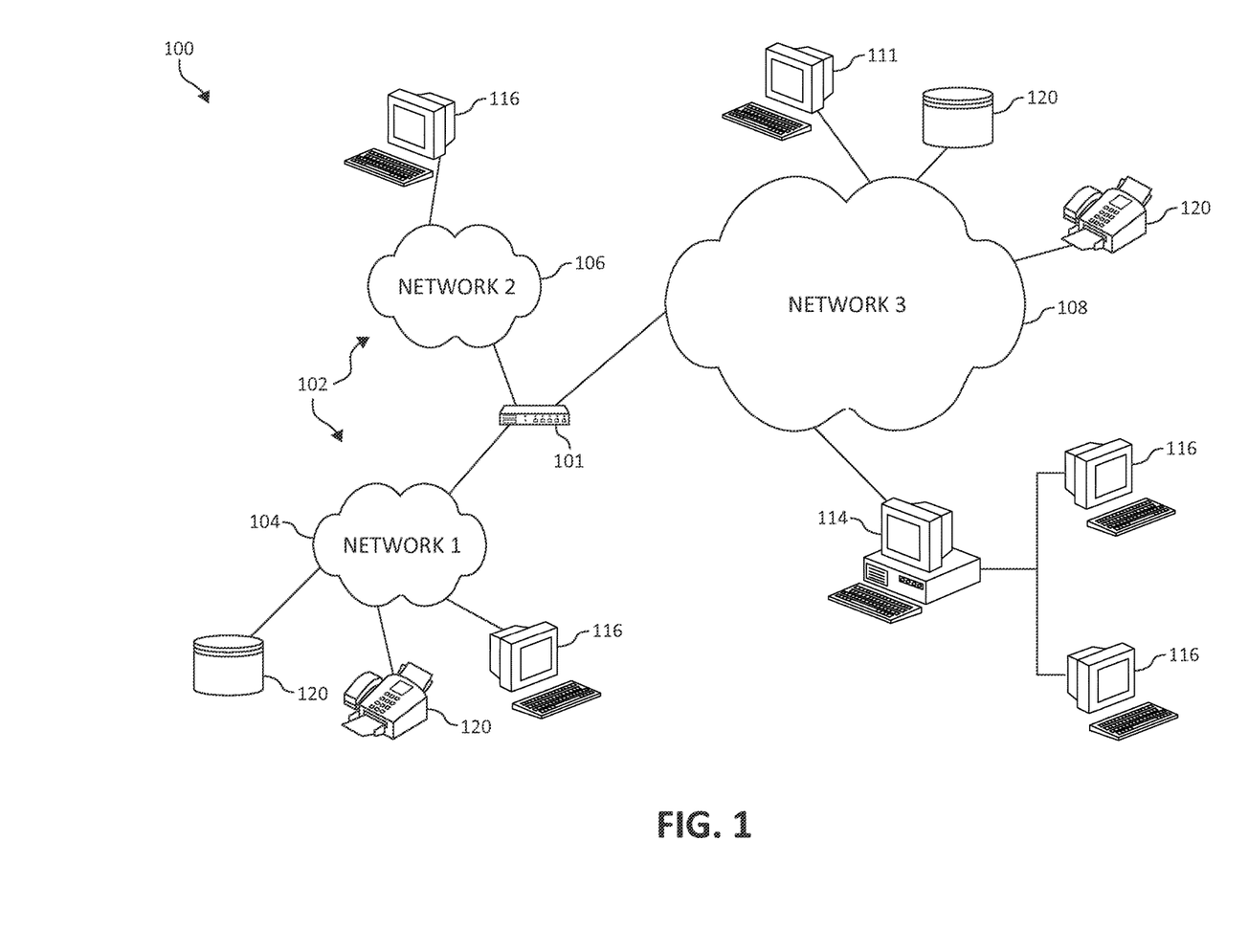
FIG. 1 is exemplary network architecture, portions of which may be incorporated into larger networks such as the Web, in which aspects of the present invention may be realized.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet public switched telephone network (PSTN), internal telephone network, etc.

As will be further described, various entities may exert control over portions of the network architecture 100 shown. For example, a certain ISP may exert control over networks 102, while another ISP may exert control over network 108. Further, networks 102 may be considered to be hierarchically denoted as a "Level 2" network, while network 108 may be considered to be hierarchically denoted as a "Level 3" network. The various hierarchical organization and associated architectures are known to one of ordinary skill in the art; and the present illustration, as one of ordinary skill in the art will appreciate, depicts only but a subset of the myriad of networks, nets and subnets that make up today's present day Web.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." in cloud computing, shared resources, such as processing power, peripherals, software, data, servers, etc., are provided to any system in the cloud in an on-demand, relationship, thereby allowing access and distribution of services across many computing systems. Cloud computing typically involves an Internet connection between the systems operating in the cloud, but other techniques of connecting the systems may also be used, as known in the art.

Figure 2:
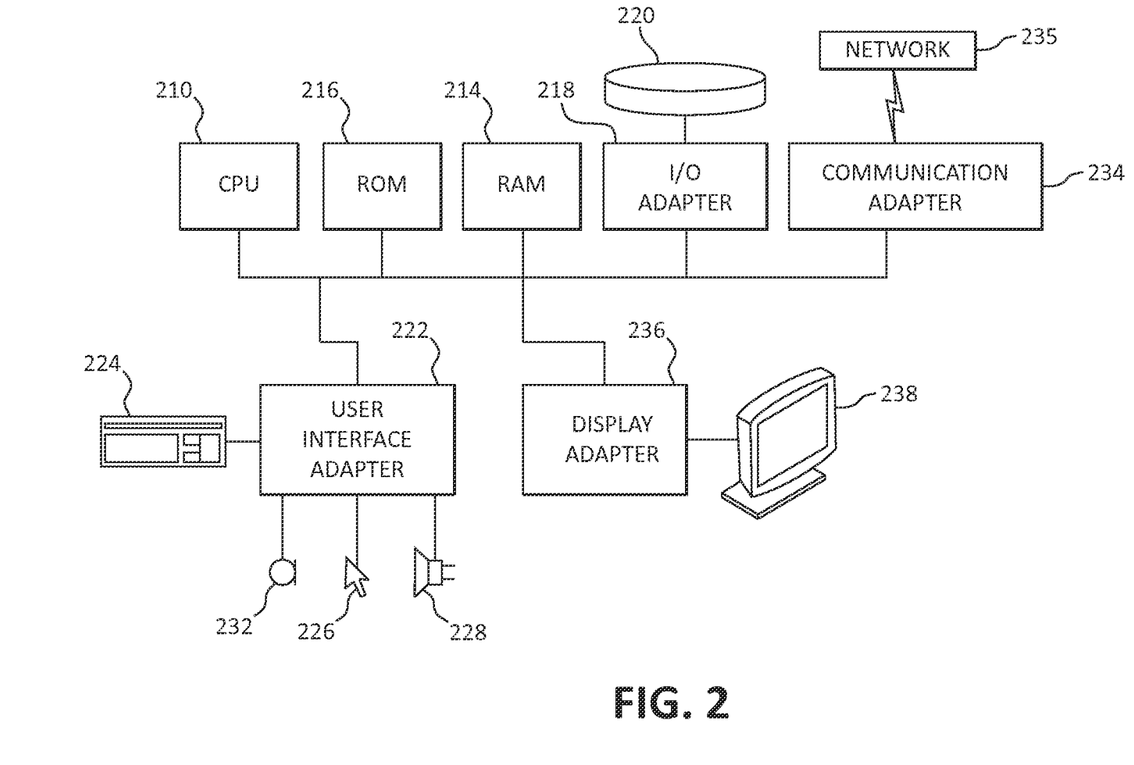
FIG. 2 is an exemplary block diagram showing a hardware structure of a data processing computer system according to the present invention in which aspects of the present invention may be realized.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that an additional embodiment may also be implemented on platforms and operating systems other than those mentioned. An embodiment may be written using JAVA, XML, C, and/or C++ language, or other programming languages, along with an object oriented programming methodology. Object oriented programming (OOP), which has become increasingly used to develop complex applications, may be used.

As previously mentioned, the illustrated embodiments make use of a MAC address, which is a unique identifier assigned to network interfaces for communications on physical network segments of the Web. MAC addresses are used as network addresses for most IEEE 802 network technologies, including Ethernet and Wi-Fi. Logically, MAC addresses are used in the media access control protocol sublayer of the OSI reference model.

MAC addresses are most often assigned by the manufacturer of a network interface Controller (NIC) and are stored in the NIC's hardware, such as the card's read-only memory or some other firmware mechanism. If assigned by the manufacturer, a MAC address usually encodes the manufacturer's registered identification number and may be referred to as the burned-in address (BIA) it may also be known as an Ethernet hardware address (EHA), hardware address or physical address. A network node may have multiple NICs, and each NIC must have a unique MAC address, as one of ordinary skill in the art will appreciate.

Figure 3:
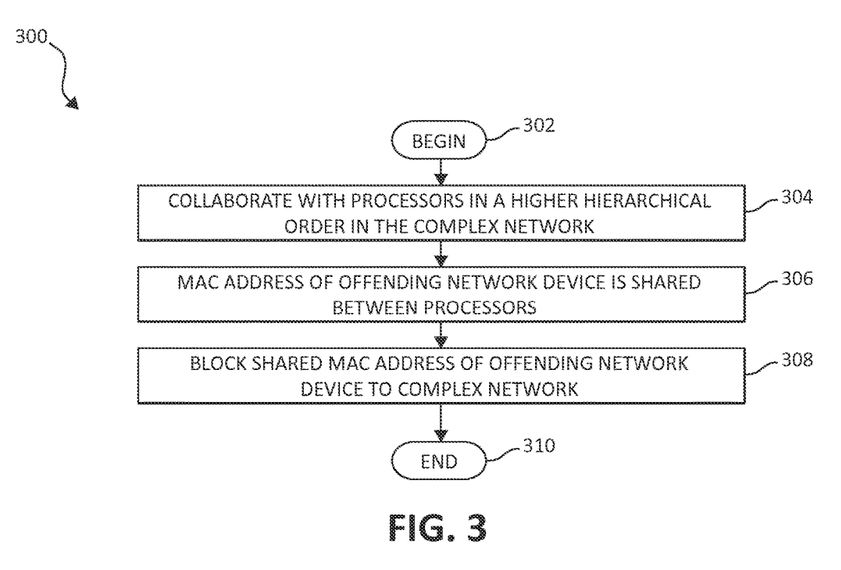
FIG. 3 is a flow chart diagram illustrating an exemplary method for enhancing security of complex networks, again in which aspects of the present invention may be realized.

Turning now to FIG. 3, a flow chart diagram of an exemplary method 300 for enhancing security in complex networks, (e.g., the Web), is depicted in accordance with various aspects of the present invention. Method 300 begins (step 302) with the collaboration of one or more processors in a higher hierarchical order in the complex network (step 304). In such collaboration, the MAC address of an offending network device is shared between processors (step 306). If a decision is made that the offending network device should be blocked of access, such access to the network is collaboratively blocked across at least those portions of the complex network that the collaborating processors are responsible (step 308). The method then ends (step 310).

In view of the illustrated aspects of method 300, the mechanisms of the present invention perform various functionality to counter illicit activity as follows. In the event, for example, of a "cyber attack" and/or identification that an illicit activity is occurring, the mechanisms of the present invention allow for various communication between both what will herein be termed the "victim" (i.e., the user or users afflicted by the offending network device), and supervisory entities, such as ISPs, to allow for rapid and lasting resolution.

Consider the following example. First, upon recognition of an attack and/or illicit activity, such as a Denial of Service (DoS) attack, illegal peer to peer sharing, or other activities, the victim's ISP is notified of the event, and begins to gather the offender's MAC address. In one embodiment, the victim's ISP then enters the offender's MAC address (in one embodiment, via lightweight data collection on the ISP side), a traceroute detailing the path that the ISP took to get to the victim's device, and a transport control protocol (TCP) dump detailing the nature of the offense, into a central repository/portal facilitated by the mechanisms of the present invention and made accessible to the ISP. Such aforementioned information, such as the ISP, MAC address, traceroute, TCP dump, and the like becomes statistical network data concerning the attack and/or illicit activity that the ISP, as will be described, will later share with other ISPs by use of the central repository.

Continuing the example, based on the nature of the offense at issue, the ISP may then flag the offense as recommending suspension, or recommend an outright block of the offender's MAC address. Once this process is completed, all layer 2 and layer 3 switches within the ISP will include the offending MAC address within their "blocked" list of their routing tables. If the action taken is a suspension, the mechanisms of the illustrated embodiments will naturally alert the ISPs subscribing to the aforementioned portal to now remove the MAC. If the action taken is an outright block, the block will remain permanently.

The aforementioned alert, notification, broadcast, and removal process may then progress to a shared MAC blocking process that permeates throughout all ISPs that are subscribing to the portal previously described. Now that the offending MAC is identified, and broadcast to all subscribers of the portal, the offender will not only not be able to reach its prior target again using that particular MAC address, but also will not be able to reach a wide variety of other potential targets due to the fact that other portions of the Web are now blocking that particular device.

Using the traceroute information provided to the portal, if the offender is accessing the Web via an ISP that is a subscriber, the subscribing ISP is thereby notified, and can take further steps to not only block the instant MAC address, but also prevent a MAC change (e.g., virtual machine, MAC mutation program, etc.) by simply terminating access to the offending MAC.

In the event, alternatively, that a false positive occurs, the mechanisms of the illustrated embodiments may leverage the shared subscription/collaborative model as described previously such that after verification of identity or another mechanism to substantiate that the MAC address is not offending in nature, the MAC address may be restored across the entire network of subscribing entities.

Figure 4:
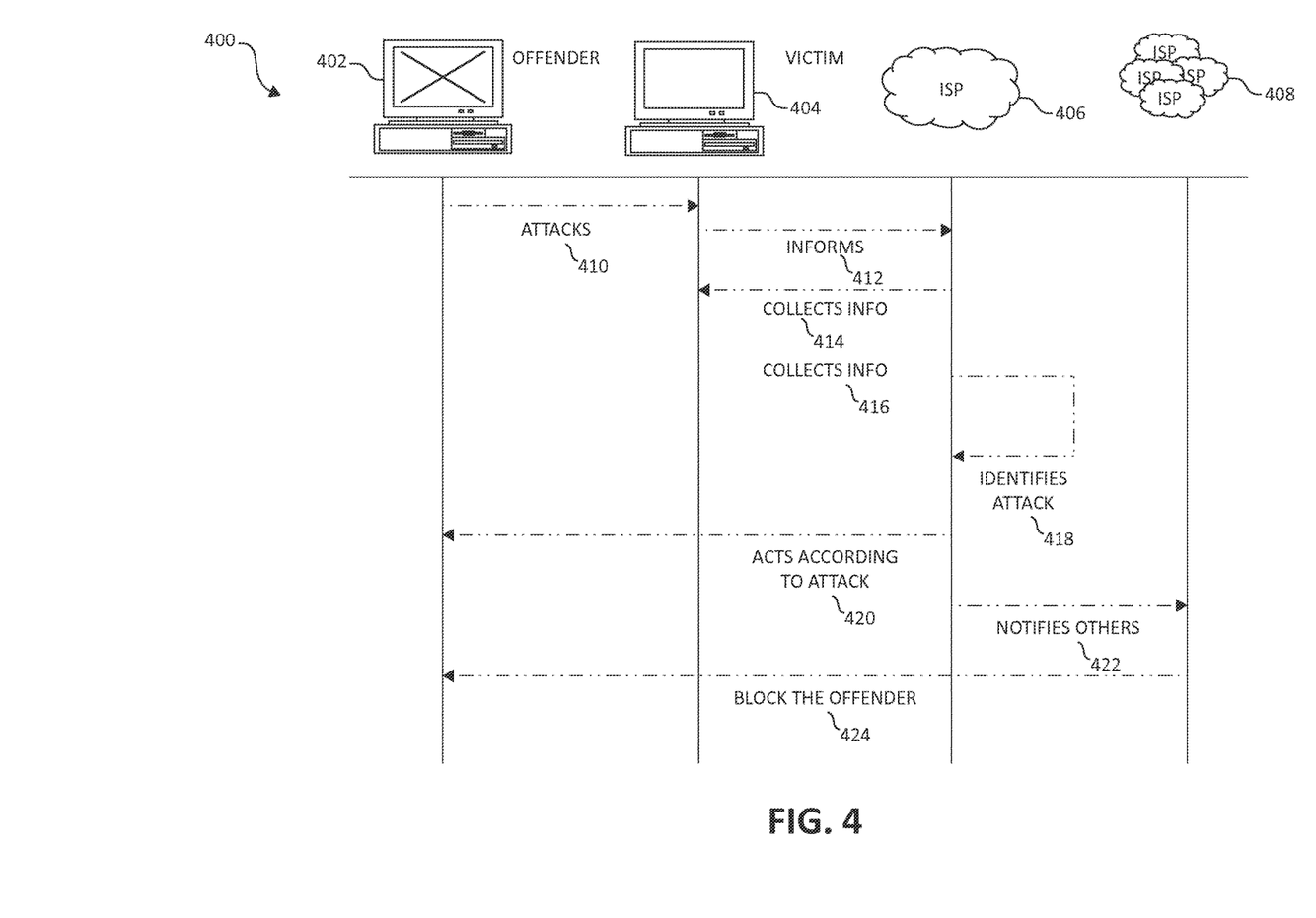
FIG. 4 is a combination block and flow diagram of one embodiment of the mechanisms of the present invention, in which a cyber attack is managed.

Turning now to FIG. 4, a combination block/flow diagram of exemplary functionality in accordance with the present invention is shown as illustration 400. Here, an offending device 402, a victim device 404, an ISP 406, and a group of subscribing ISPs 408 are shown. It will be appreciated by one of ordinary skill in the art that use of the terminology "ISP" also makes reference to controlling devices (e.g., processors) that are responsible for the oversight of the networks, nets and subnets under the ISP's control. For example, various hardware depicted in FIG. 2, previously, such as CPU 210, ROM 216, RAM 214, and the I/O adapter 218, may implement functionality as presently described.

As a first step, in response to attacks 410 by the offending device 402 that are identified by the victim device 404, the victim device 404 informs 412 their respective ISP 406. The ISP 406 then collects information 414, 416 as previously described, and thereby identifies an attack 418 as shown.

Once the attack is identified, the ISP takes a course of action 420, and notifies 422 other subscribing ISPs 408 of the offender 402's MAC address, traceroute, TCP dump information and other pertinent network statistical information, as one of ordinary skill in the art will appreciate, through the portal/central repository. The ISPs then collectively act to block 424 the offending device 402 as shown.

Figure 5:
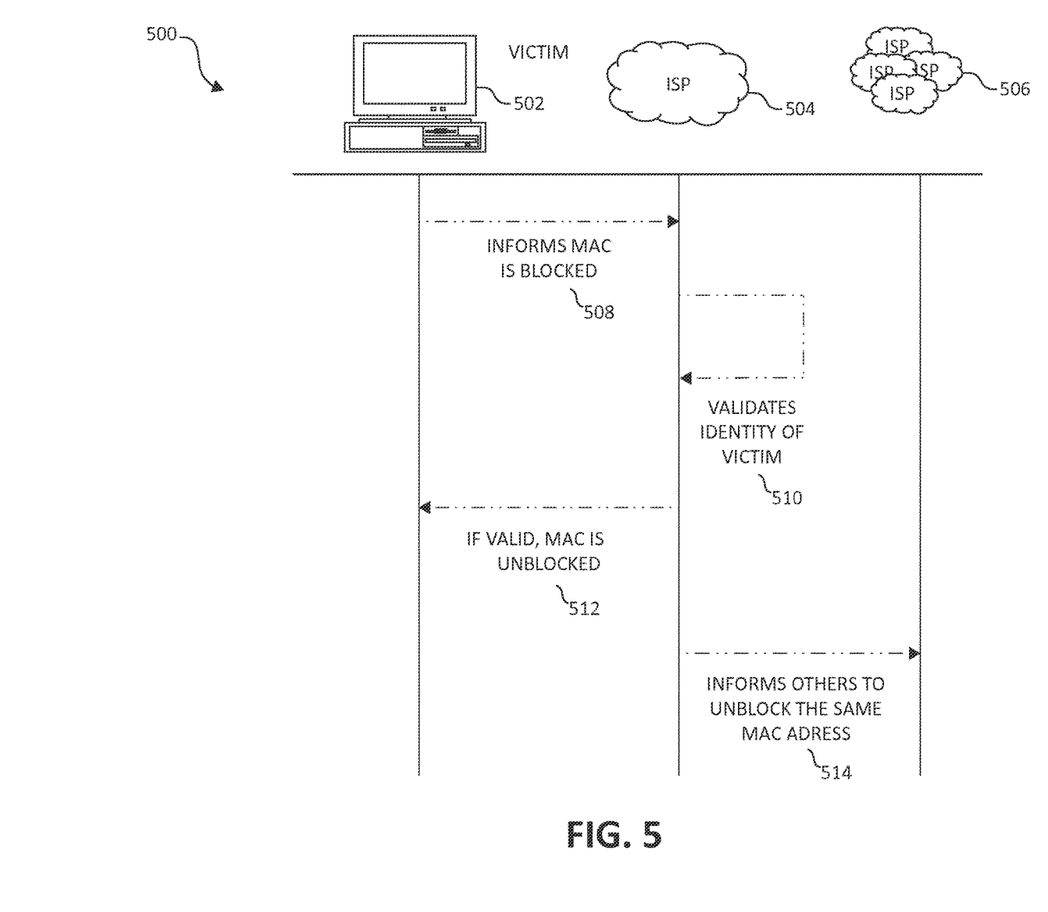
FIG. 5 is an additional combination block and flow diagram of an additional embodiment of the mechanisms of the present invention, here where a false positive is managed.

FIG. 5, following, depicts illustration 500, which shows an alternative use case having a false positive reading. Here the victim device 502, their ISP 504, and subscribing ISPs 506 are shown. As a first step, the victim device 502 informs their ISP 504 that their MAC address is blocked 508. The ISP 504 then takes action to validate 510 the identity of the victim device 502. If the device is validated, the MAC is unblocked 512, and the ISP 504 informs the subscribing ISPs 506 to do the same 514 as shown.

Figure 6:
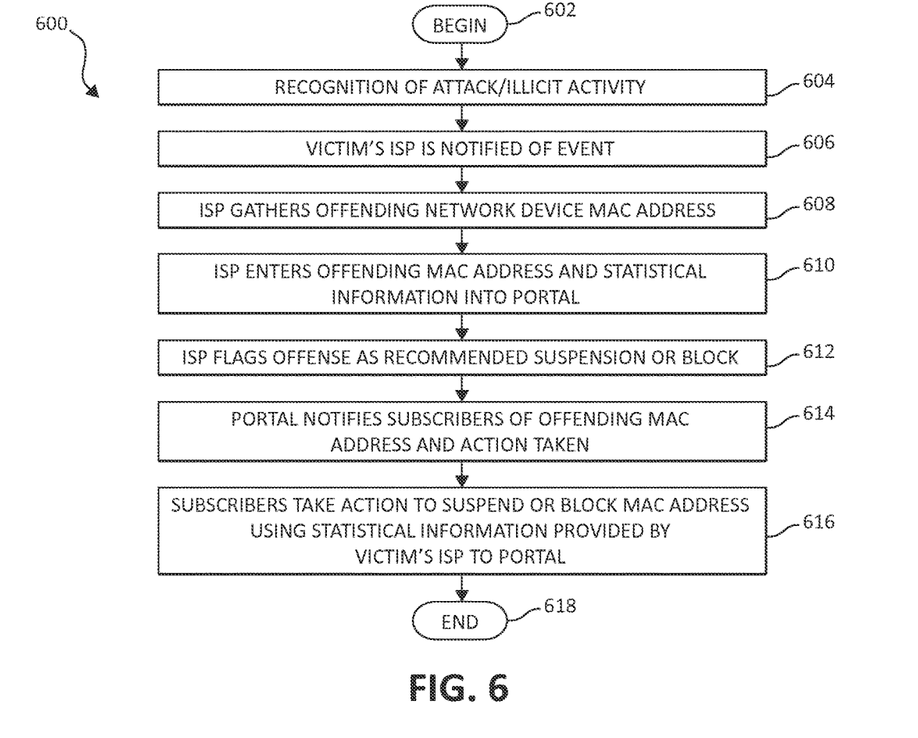
FIG. 6 is a flow chart diagram further illustrating, among further aspects, functional aspects previously described in FIG. 4.

FIG. 6, following, illustrates an exemplary method for enhancing security in complex networks, in view of the functionality previously depicted in FIG. 4, as method 600. Method 600 begins (step 602) with the recognition of an attack or other illicit activity (step 604). The victim device's ISP is notified of the event (step 606).

The victim's ISP then gathers the offending network device's MAC address and other information as previously described (step 608), which the ISP then enters into the repository/portal (step 610). Once analyzed, this information helps the ISP determine a course of action to be taken. If the ISP determines such, the ISP flags the offense as either recommending a temporary suspension or an outright block, or an additional course of action, such as monitoring the MAC address for a predetermined time to obtain additional information (step 612).

In addition, and as a next step 614, the portal notifies subscribers of the offending MAC address, other network statistical information as necessary, and any action taken. In turn, the subscribers take action in their own networks to suspend or block (or other appropriate action) the offending devices from their own networks by using the MAC and other statistical information, as appropriate, which is provided by the victim device's ISP to the portal, and in turn, to the subscribers by the portal (step 616). The method 600 then ends (step 618).

Figure 7:
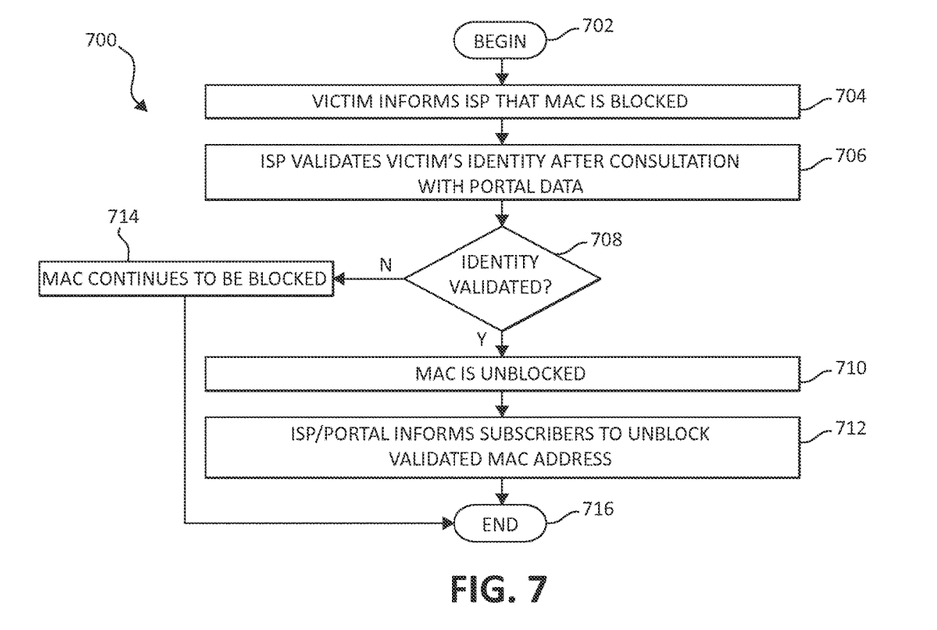
FIG. 7 is an additional flow chart diagram further illustrating, among further aspects, functional aspects previously depicted in FIG. 5.

FIG. 7, following, illustrates an additional exemplary method for enhancing security in complex networks, here in view of the functionality previously described in FIG. 5, as method 700. Method 700 begins (step 702) with the notification of a victim devices' ISP that their respective MAC address has been blocked (step 704). Their ISP then validates the victim's identity after consolation with portal data (step 706).

In decision step 708, if the victim's identity is validated, the MAC address is unblocked (step 710), and the victim's ISP notifies other subscribers to unblock the validated MAC address (step 712). Conversely, if the victim's identity is not validated, the MAC address continues to be blocked, and the present course of action on the address continues (step 714). In both cases, the method 700 then ends (step 716).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for enhancing security in a network by a computer processor device, comprising:
   collaborating, by the computer processor device of a network hardware entity under management of a first internet service provider (ISP) at a local-to-a-user, first level, with at least one additional computer processor device of at least one additional and separate network hardware entity under management of a second ISP in a higher hierarchical order in the network such that the at least one additional computer processor device in the higher hierarchical order in the network maintains control over level two portions comprising ISP-local portions and level three portions comprising remote portions within the second ISP of the network, wherein a Media Access Control (MAC) address of an offending network device is shared between the computer processor devices such that access of the offending network device to portions of the network under the supervisory control of the computer processor devices may be subsequently blocked; and
   upon a collective determination by the computer processor device and the at least one additional computer processor device, blocking the MAC access of the offending network device to the network.

2. The method of claim 1, further including identifying, by at least one of the computer processor device and the at least one additional computer processor device, the MAC address of the offending network device.

3. The method of claim 2, further including one of:
   providing, by the computer processor device, the MAC address of the offending network device to the at least one additional computer processor device, and
   providing, by the at least one additional computer processor device, the MAC address of the offending network device to the computer processor device.

4. The method of claim 1, further including facilitating, by at least one of the computer processor device and the at least one of the additional computer processor devices, sharing of network statistical data associated with the offending network device, to a central data repository to be used to notify additional computer processor devices of offending activity by the offending network device.

5. The method of claim 1, further including, upon a collective determination by the computer processor device and the at least one additional computer processor device, unblocking the MAC address of the offending network device to the network.

6. A system for enhancing security in a network, comprising:
   a computer processor device of a network hardware entity under management of a first internet service provider (ISP) at a local-to-a-user, first level that collaborates with at least one additional computer processor device of at least one additional and separate network hardware entity under management of a second ISP in a higher hierarchical order in the network such that the at least one additional computer processor device in the higher hierarchical order in the network maintains control over level two portions comprising ISP-local portions and level three portions comprising remote portions within the second ISP of the network, wherein a Media Access Control (MAC) address of an offending network device is shared between the computer processor devices such that access of the offending network device to portions of the network under the supervisory control of the computer processor devices may be subsequently blocked, and
   upon a collective determination by the computer processor device and the at least one additional computer processor device, the MAC access of the offending network device is blocked to the network.

7. The system of claim 6, wherein at least one of the computer processor device and the at least one additional computer processor device identifies the MAC address of the offending network device.

8. The system of claim 7, wherein at least one of:
   the computer processor device provides the MAC address of the offending network device to the at least one additional computer processor device, and
   the at least one additional computer processor device provides the MAC address of the offending network device to the computer processor device.

9. The system of claim 6, wherein the at least one of the computer processor device and the at least one of the additional computer processor devices facilitate sharing of network statistical data associated with the offending network device to a central data repository to be used to notify additional computer processor devices of offending activity by the offending network device.

10. The system of claim 6, wherein upon a collective determination by the computer processor device and the at least one additional computer processor device, the MAC address of the offending network device is unblocked to the network.

11. A computer program product for enhancing security in a network by a computer processor device, the computer program product comprising a non-transitory computer-readable storage medium having computer-readable program code portions stored therein, the computer-readable program code portions comprising:
  a first executable portion that collaborates, by the computer processor device of a network hardware entity under management of a first internet service provider (ISP) at a local-to-a-user, first level, with at least one additional computer processor device of at least one additional and separate network hardware entity under management of a second ISP in a higher hierarchical order in the network such that the at least one additional computer processor device in the higher hierarchical order in the network maintains control over level two portions comprising ISP-local portions and level three portions comprising remote portions within the second ISP of the network, wherein a Media Access Control (MAC) address of an offending network device is shared between the computer processor devices such that access of the offending network device to portions of the network under the supervisory control of the processor devices may be subsequently blocked; and
  upon a collective determination by the computer processor device and the at least one additional computer processor device, blocks the MAC access of the offending network device to the network.

12. The computer program product of claim 11, further including a second executable portion that facilitates, by the at least one of the computer processor device and the at least one additional computer processor device, identification of the MAC address of the offending network device.

13. The computer program product of claim 12, further including a third executable portion that performs at least one of:
  providing the MAC address of the offending network device to the at least one additional computer processor device, and
  providing the MAC address of the offending network device to the computer processor device.

14. The computer program product of claim 11, further including a second executable portion that facilitates, by the at least one of the computer processor device and the at least one of the additional computer processor devices, sharing of network statistical data associated with the offending network device to a central data repository to be used to notify additional computer processor devices of offending activity by the offending network device.

15. The computer program product of claim 11, further including a second executable portion that, upon a collective determination by the processor device and the at least one additional processor device, unblocks the MAC address of the offending network device to the network.

* * * * *